US012320509B2

(12) United States Patent
Veenstra et al.

(10) Patent No.: US 12,320,509 B2
(45) Date of Patent: Jun. 3, 2025

(54) SYSTEMS AND METHODS FOR CONTROLLING THE POSITION OF A MOVING LIGHT FIXTURE

(71) Applicant: Electronic Theatre Controls, Inc., Middleton, WI (US)

(72) Inventors: Nicholas Veenstra, Austin, TX (US); David K. Peck, Austin, TX (US)

(73) Assignee: Electronic Theatre Controls, Inc., Middleton, WI (US)

( * ) Notice: Subject to any disclaimer, the term of this patent is extended or adjusted under 35 U.S.C. 154(b) by 176 days.

(21) Appl. No.: 17/876,711

(22) Filed: Jul. 29, 2022

(65) Prior Publication Data
US 2024/0035647 A1 Feb. 1, 2024

(51) Int. Cl.
*H02P 8/34* (2006.01)
*F21V 14/02* (2006.01)
(Continued)

(52) U.S. Cl.
CPC ............... *F21V 21/15* (2013.01); *F21V 14/02* (2013.01); *G01D 5/12* (2013.01); *H02P 8/14* (2013.01);
(Continued)

(58) Field of Classification Search
CPC .......... H02P 9/08; H02P 2203/05; H02P 8/14; H02P 8/22; H02P 8/34; H02P 23/22
See application file for complete search history.

(56) References Cited

U.S. PATENT DOCUMENTS 6,043,483 A * 3/2000 Schreiber ................. G01D 5/36
377/17
9,217,559 B2 12/2015 Rasmussen et al.
(Continued)

FOREIGN PATENT DOCUMENTS

CN 218565221 U 3/2023
EP 3789669 A1 3/2021

OTHER PUBLICATIONS

United Kingdom Patent Office Search Report for Application No. GB2310326.0 dated Jan. 2, 2024 (5 pages).
(Continued)

*Primary Examiner* — Kawing Chan
*Assistant Examiner* — Charles S Laughlin
(74) *Attorney, Agent, or Firm* — Michael Best & Friedrich LLP

(57) ABSTRACT

A moving light fixture and methods for controlling the position of the moving light fixture. The moving light fixture includes a housing, a motor operably coupled to the housing to rotate the housing about an axis of rotation, and an indexer configured to rotate in conjunction with the housing. A magnetic position encoder transmits a first position signal indicating an angular position of the housing, and an optical sensor transmits a second position signal indicating a position of the indexer. An electronic controller receives a target position for the moving light fixture, determines an angular position of the housing based on the first position signal, determines a position of the indexer based on the second position signal, determines a current position of the housing, and drives the motor to move the housing from the current angular position to the target position based on the position of the indexer.

20 Claims, 14 Drawing Sheets

(51) Int. Cl.
  *F21V 21/15*   (2006.01)
  *G01D 5/12*    (2006.01)
  *H02P 6/34*    (2016.01)
  *H02P 8/14*    (2006.01)
  *H02P 8/22*    (2006.01)
  *H05B 47/18*   (2020.01)
  *F21V 21/30*   (2006.01)

(52) U.S. Cl.
  CPC .............. *H02P 8/22* (2013.01); *H02P 8/34* (2013.01); *H05B 47/18* (2020.01); *F21V 21/30* (2013.01)

(56) References Cited

U.S. PATENT DOCUMENTS

| | | |
|---|---|---|
| 9,920,914 B2 | 3/2018 | Rasmussen et al. |
| 10,274,175 B1 | 4/2019 | Wood et al. |
| 10,415,805 B2 | 9/2019 | Venturati |
| 2003/0222798 A1* | 12/2003 | Floros .............. H03M 1/206 341/3 |
| 2021/0055104 A1* | 2/2021 | Müller .............. B25F 5/001 |

OTHER PUBLICATIONS

United Kingdom Search Report for Application No. 2310326.0 dated Sep. 2, 2024 (5 pages).
United Kingdom intellectual Property Office Examination Report for Application No. 2310326.0 dated Feb. 21, 2025 (4 pages).

* cited by examiner

SYSTEMS AND METHODS FOR CONTROLLING THE POSITION OF A MOVING LIGHT FIXTURE

FIELD

Embodiments described herein relate to controlling the position of a moving light fixture.

SUMMARY

Moving light fixtures are often propelled by motors, such as either DC servo motors or stepper motors. DC servo motors provide full positional feedback. Stepper motors are relative position devices that require a known reference position. The pan and tilt axes in a moving light fixture with stepper motors may require homing to a known position on start-up. This homing operation takes time to complete and requires that the moving light fixture has full, unencumbered movement. The homing operation precludes operating the moving light fixture on a tightly packed lighting bar, directing the moving light fixture through a window or aperture, or otherwise operating the moving light fixture with a restricted range of movement. The homing operation also produces an undesirable noise in theatrical environments, especially if re-homing needs to occur during a live production.

Some moving light fixtures with stepper motors address homing operation issues using optical quadrature encoders. However, optical quadrature encoders provide only relative position feedback, not absolute. Magnetic position encoders assist in identifying a quadrant in which the moving light fixture is located. For example, U.S. Pat. No. 10,274,175, incorporated herein by reference, discloses using magnetic position encoders to assist in driving a stepper motor from a current position to a target position. Embodiments described herein further increase the positional accuracy of movement of the light fixture by further implementing a quadrature or optical sensor in combination with a magnetic absolute encoders. For example, a magnetic position encoder approximately identifies a quadrant location of the light fixture. An indexer, such as a gear or notched wheel with tabs, rotates with the light fixture. The quadrature or optical sensor identifies the edge of the nearest tab on the indexer as it turns on the same driven axis. The tab is used to further adjust the position of the light fixture with an additional level of accuracy.

One embodiment provides a moving light fixture including a housing and one or more lights disposed within the housing. The moving light fixture includes a motor operably coupled to the housing such that the motor rotates the housing about an axis of rotation and an indexer configured to rotate in conjunction with the housing along the axis of rotation. The moving light fixture includes a magnetic position encoder configured to transmit a first position signal indicating an angular position of the housing about the axis of rotation, and an optical sensor configured to transmit a second position signal indicating a position of the indexer about the axis of rotation. The moving light fixture includes an electronic controller connected to the motor, the magnetic sensor, and the optical sensor. The electronic controller is configured to receive a target position for the moving light fixture, determine an angular position of the housing about the axis of rotation based on the first position signal, and determine a position of the indexer within the current angular position based on the second position signal. The electronic controller is configured to determine a current position of the housing based on the angular position and the position of the indexer and drive the motor to move the housing from the current angular position to the target position based on the position of the indexer.

Another embodiment provides a method of controlling a position of a moving light fixture, the moving light fixture including one or more light sources disposed within a housing, a motor operably coupled to the housing such that the motor rotates the housing about an axis of rotation, and an indexer configured to rotate in conjunction with the housing along the axis of rotation. The method includes receiving a target position for the moving light fixture, determining, with an electronic controller and based on a first signal from a magnetic position encoder, an angular position of the housing about the axis of rotation, and determining, with the electronic controller and based on a second signal from an optical sensor, a position of the indexer within the angular position. The method includes determining, with the electronic controller, a current position of the housing based on the angular position of the housing about the axis of rotation and the position of the indexer, and driving, with the electronic controller, the motor to move the housing from the current position to the target position.

Another embodiment provides a moving light fixture including a housing and one or more light sources disposed within the housing. The moving light fixture includes a motor operably coupled to the housing such that the motor rotates the housing about an axis of rotation and an indexer configured to rotate in conjunction with the housing along the axis of rotation. The moving light fixture includes a magnetic position encoder configured to transmit a first position signal indicating an angular position of the housing about the axis of rotation and an optical sensor configured to transmit a second position signal indicating a position of the indexer about the axis of rotation. The moving light fixture includes an electronic controller connected to the motor, the magnetic sensor, and the optical sensor. The electronic controller is configured to receive a target position for the moving light fixture, determine an angular position of the housing about the axis of rotation based on the first position signal, and determine a current full step of the motor based on the current angular position. The electronic controller is configured to determine a current position of the indexer within the current angular position based on the second position signal and determine a current micro step of the motor based on the current position of the indexer. The electronic controller is configured to determine a current position of the housing based on the current full step of the motor and the current micro step of the motor, and drive the motor to move the housing from the current position to the target position.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practice or of being carried out in various ways.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components, may be utilized to implement the disclosure. Furthermore, and as described in subsequent paragraphs, the specific configurations illustrated in the drawings are intended to exemplify implementations of the disclosure. Alternative configurations are possible.

Other aspects of the embodiments will become apparent by consideration of the detailed description and accompanying drawings.

DETAILED DESCRIPTION

Embodiments described herein relate to systems, methods, and devices for controlling the position of an automated luminaire or moving light fixture. The moving light fixture includes, among other things, one or more light sources (for example, incandescent light sources, LED light sources, etc.), one or more motors, and an electronic controller. The electronic controller is configured to regulate or control the position of the moving light fixture based on full positional feedback. For example, the electronic controller uses the current position of the moving light fixture to determine how to operate the one or more stepper motors to move the light fixture to a target position. However, upon power up, the current position of the moving light fixture is unknown. As such, the electronic controller is configured to determine the absolute position of the moving light fixture.

Figure 1:
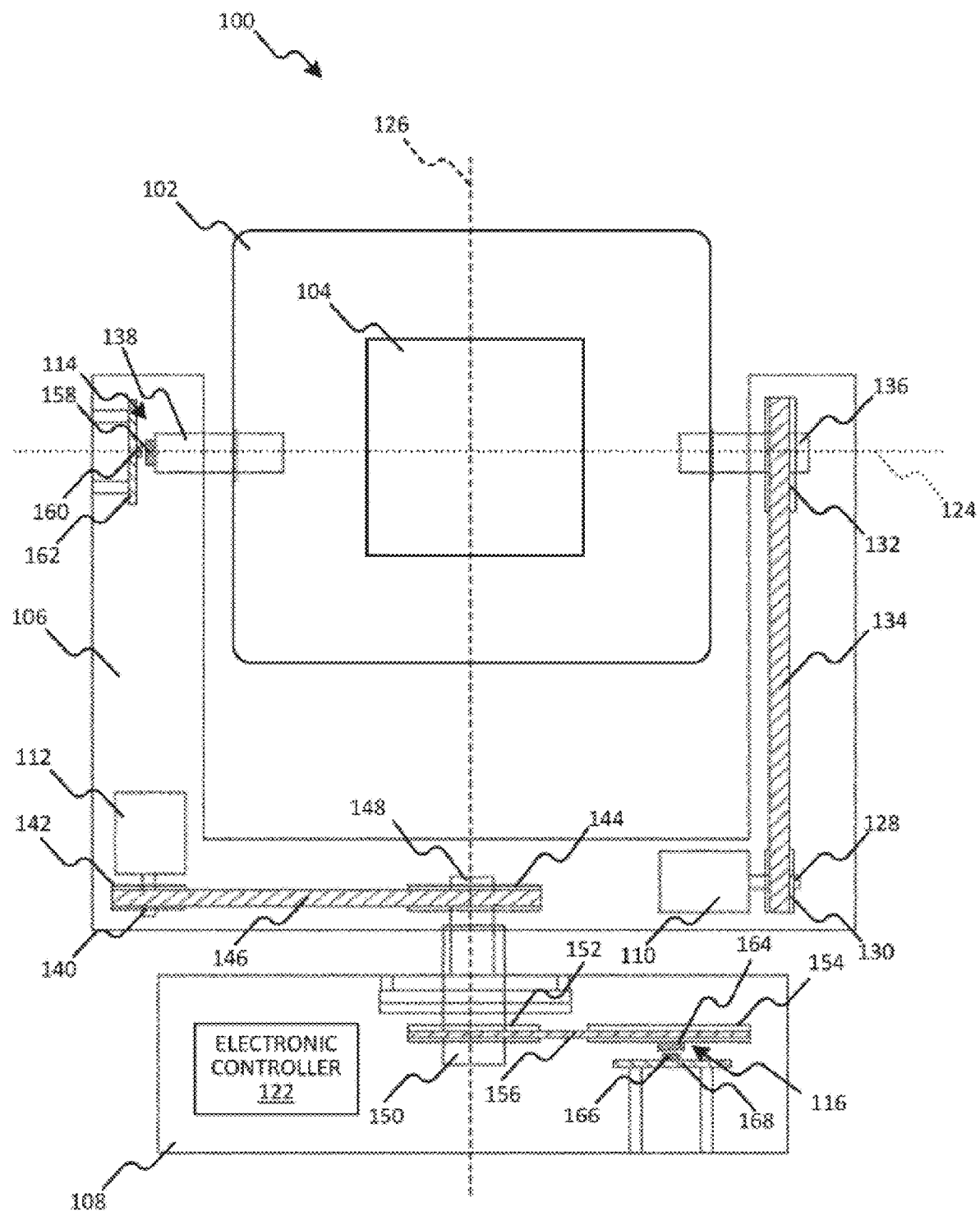
FIG. 1 is a diagram of a moving light fixture, in accordance with some embodiments.

In some implementations, moving light fixtures are used in, for example, a theatre, a hall, an auditorium, a studio, or the like. Each moving light fixture 100 includes, among other things, a housing 102, one or more light sources 104, a frame 106, a base 108, a first motor 110, a second motor 112, a first magnetic position encoder 114, a second magnetic position encoder 116, and an electronic controller 122, as illustrated in the embodiment of FIG. 1. The one or more light sources 104 are disposed (e.g., positioned) within the housing 102. The first motor 110 is operably coupled to the housing 102 such that the first motor 110 rotates the housing 102 about a first axis of rotation 124 (e.g., a horizontal axis). The second motor 112 is operably coupled to the housing 102 such that the second motor 112 rotates the housing 102 about a second axis of rotation 126 (e.g., a vertical axis). In some embodiments, the second axis of rotation 126 is perpendicular to the first axis of rotation 124.

In the example embodiment illustrated in FIG. 1, the first motor 110 is configured to apply torque to a first output shaft 128. A first pulley 130 is mounted on the first output shaft 128 for rotation together therewith. The first pulley 130 is coupled to a second pulley 132 via a first belt 134 to transfer torque therebetween. The second pulley 132 is mounted to a first shaft 136 for rotation together therewith. The first shaft 136 is fixably coupled to the housing 102 such that the housing 102 and the first shaft 136 rotate together about the first axis of rotation 124. The housing 102 is also fixably coupled to a second shaft 138 such that the second shaft 138, the housing 102, and the first shaft 136 all rotate together about the first axis of rotation 124.

In the example embodiment illustrated in FIG. 1, the second motor 112 is configured to apply torque to a second output shaft 140. A third pulley 142 is mounted on the second output shaft 140 for rotation together therewith. The third pulley 142 is coupled to a fourth pulley 144 via a second belt 146 to transfer torque therebetween. The fourth pulley 144 is fixably coupled to a third shaft 148. The third shaft 148 is fixably coupled to the base 108. In operation, the second motor 112 applies a torque to the fourth pulley 144 (via the second output shaft 140, the third pulley 142, and the second belt 146) which causes the frame 106 to rotate about the second axis of rotation 126. The housing 102 is coupled to the frame 106 via the first shaft 136 and the second shaft 138 such that the housing 102 rotates with the frame 106 about the second axis of rotation 126. A fourth shaft 150 is fixably coupled to the frame 106 such that the fourth shaft 150, the frame 106, and the housing 102 all rotate together about the second axis of rotation 126. The fourth shaft 150 partially extends into the base 108 along the second axis of rotation 126. A fifth pulley 152 is fixably mounted to the fourth shaft 150 such that the fifth pulley 152, the fourth shaft 150, the frame 106, and the housing 102 all rotate together about the second axis of rotation 126. The fifth pulley 152 is coupled to a sixth pulley 154 via a third belt 156 to transfer torque therebetween.

The first magnetic position encoder 114 is configured to measure the angular position of the housing 102 about the first axis of rotation 124. The first magnetic position encoder 114 includes, among other things, a first magnet 158 and a first magnetic position sensor 160. In the example embodiment illustrated in FIG. 1, the first magnet 158 is fixably mounted to an end of the second shaft 138 such that the first magnet 158, the second shaft 138, the housing 102, and the first shaft 136 all rotate together about the first axis of rotation 124. The first magnetic position sensor 160 is fixably mounted to the frame 106 via a first circuit board 162. In some embodiments, the first magnet 158 is fixably mounted to an end of the first shaft 136 such that the first magnet 158, the first shaft 136, and the housing 102 all rotate together about the first axis of rotation 124. Alternatively, in some embodiments, the first magnetic position sensor 160 is fixably mounted to an end of the first shaft 136 or the second shaft 138 such that the first magnetic position sensor 160, the first shaft 136, the second shaft 138, and the housing 102 all rotate together about the first axis of rotation 124. In such embodiments, the first magnet 158 is fixably mounted to the frame 106, for example, via the first circuit board 162.

The first magnetic position sensor 160 is positioned adjacent to the first magnet 158 such that the first magnetic position sensor 160 measures the angular position of the first magnet 158. Rotational movement of the housing 102 about the first axis of rotation 124 changes the relative angular position between the first magnet 158 and the first magnetic position sensor 160. Thus, the measured angular position of the first magnet 158 directly correlates to the angular position of the housing about the first axis of rotation 124.

The second magnetic position encoder 116 is configured to measure the angular position of the housing 102 about the second axis of rotation 126. The second magnetic position encoder 116 includes, among other things, a second magnet 164 and a second magnetic position sensor 166. In the example embodiment illustrated in FIG. 1, the second magnet 164 is fixably mounted to the sixth pulley 154 for rotation together therewith. The second magnetic position sensor 166 is fixably mounted to the base 108 via a second circuit board 168. In some embodiments, the second magnetic position sensor 166 is fixably mounted to the sixth pulley 154 for rotation together therewith. In such embodiments, the second magnet 164 is fixably mounted to the base 108, for example, via the second circuit board 168.

The second magnetic position sensor 166 is positioned adjacent to the second magnet 164 such that the second magnetic position sensor 166 measures the angular position of the second magnet 164. Rotational movement of the housing 102 about the second axis of rotation 126 changes the relative angular position between the second magnet 164 and the second magnetic position sensor 166. Thus, the measured angular position of the second magnet 164 directly correlates to the angular position of the housing about the second axis of rotation 126.

Figure 2A:
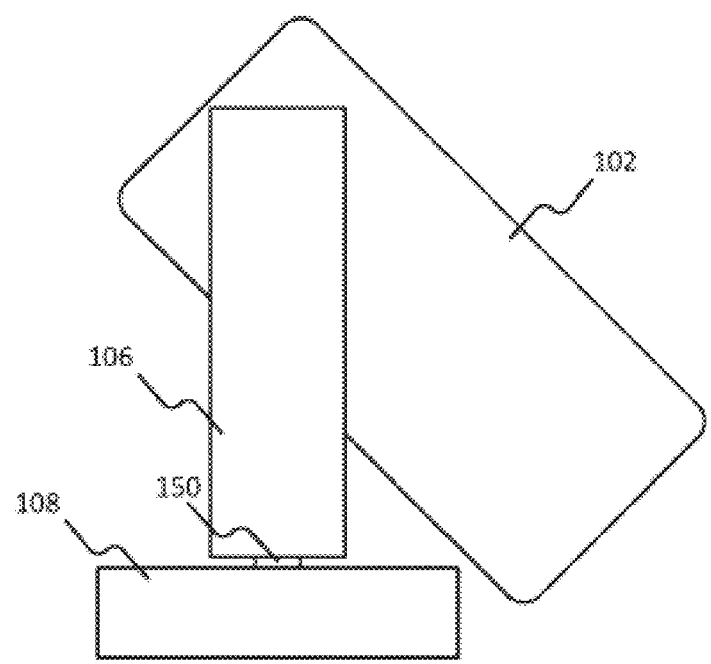
FIG. 2A is a side view of a moving light fixture at a first tilt position, in accordance with some embodiments.
Figure 2B:
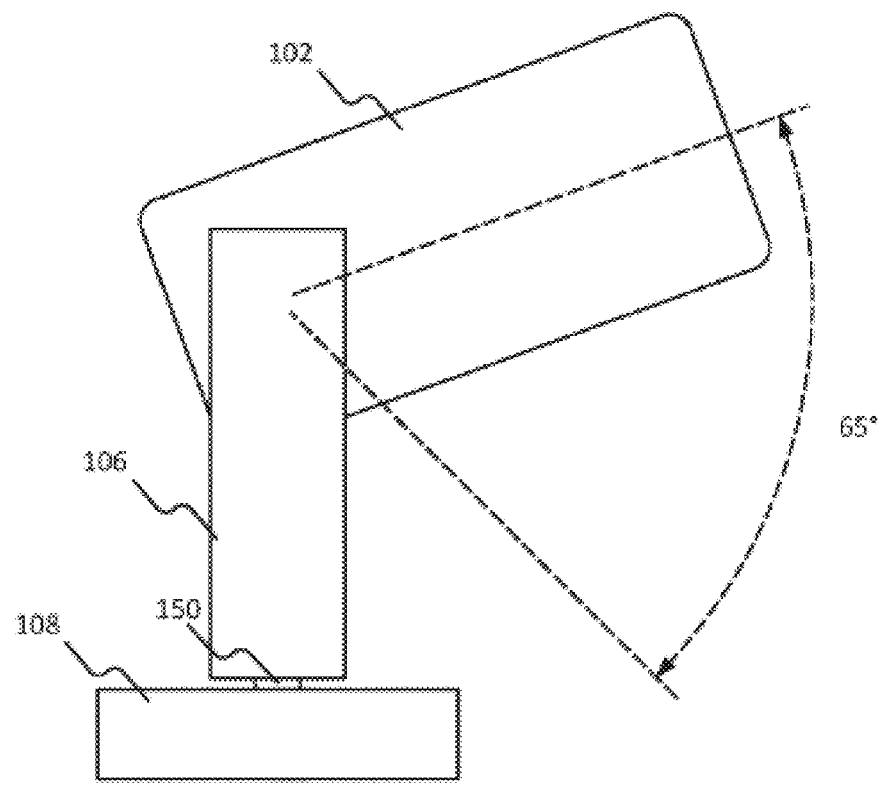
FIG. 2B is a side view of a moving light fixture at a second tilt position, in accordance with some embodiments.

As described, the first motor 110 is operably configured to rotate the housing 102 about the first axis of rotation 124. In some embodiments, rotation about the first axis of rotation 124 is a tilting motion. FIG. 2A is a side view of the moving light fixture 100 in which the housing 102 is positioned at a first angular position on the first axis of rotation 124 (for example, a reference tilt position). FIG. 2B is a side view of the moving light fixture 100 after the housing 102 is rotated about the first axis of rotation 124 such that the housing 102 is positioned at a second angular position on the first axis of rotation 124. The angle between the first angular position illustrated in FIG. 2A and the second angular position illustrated in FIG. 2B is 65 degrees.

Figure 3A:
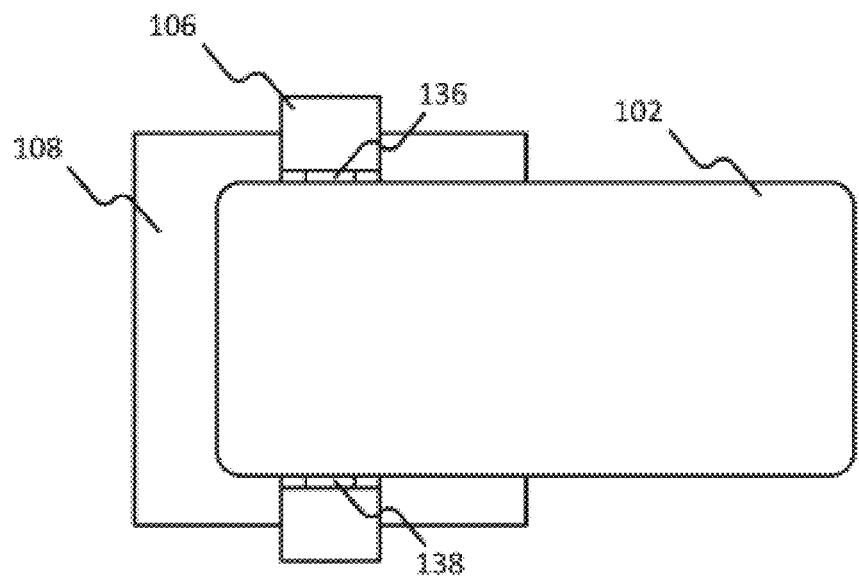
FIG. 3A is a top view of a moving light fixture at a first pan position, in accordance with some embodiments.
Figure 3B:
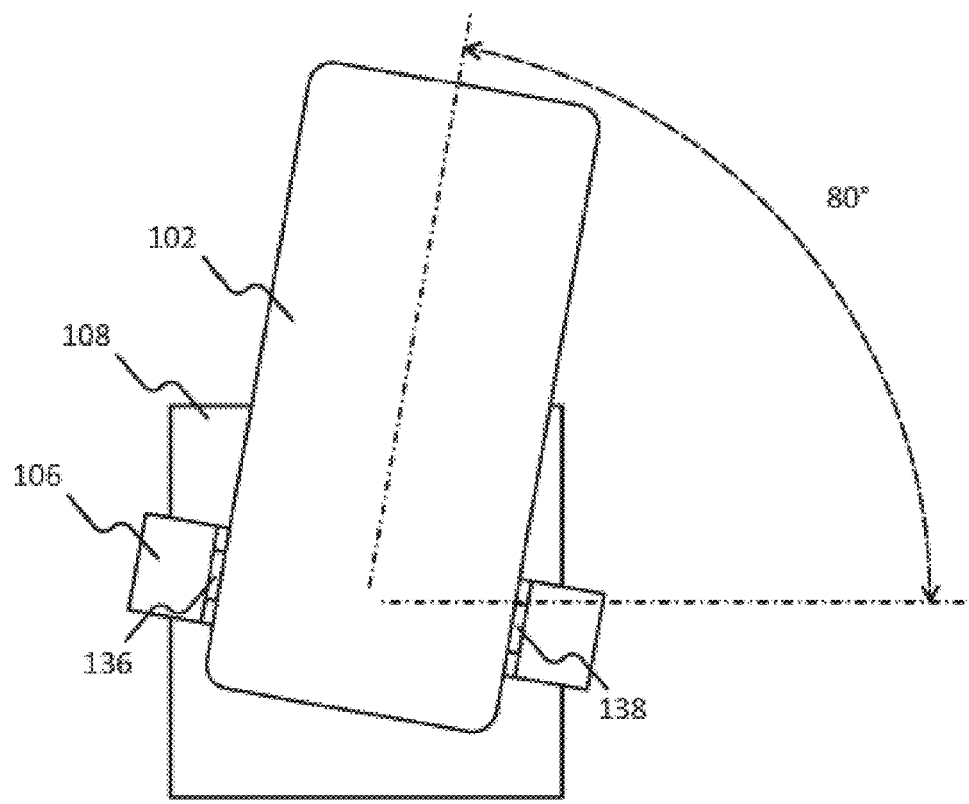
FIG. 3B is a top view of a moving light fixture at a second pan position, in accordance with some embodiments.

Also, as described above, the second motor 112 is operably configured to rotate the frame 106 and the housing 102 about the second axis of rotation 126. In some embodiments, rotation about the second axis of rotation 126 is a panning motion. FIG. 3A is a top view of the moving light fixture 100 in which the housing 102 and the frame 106 are positioned at a first angular position on the second axis of rotation 126 (for example, a reference pan position), in accordance with some embodiments. FIG. 3B is a top view of the moving light fixture 100 after the housing 102 and the frame 106 are rotated about the second axis of rotation 126 such that the housing 102 and the frame 106 are positioned at a second angular position on the second axis of rotation 126), in accordance with some embodiments. The angle between the first angular position illustrated in FIG. 3A and the second angular position illustrated in FIG. 3B is approximately 80 degrees.

Figure 4:
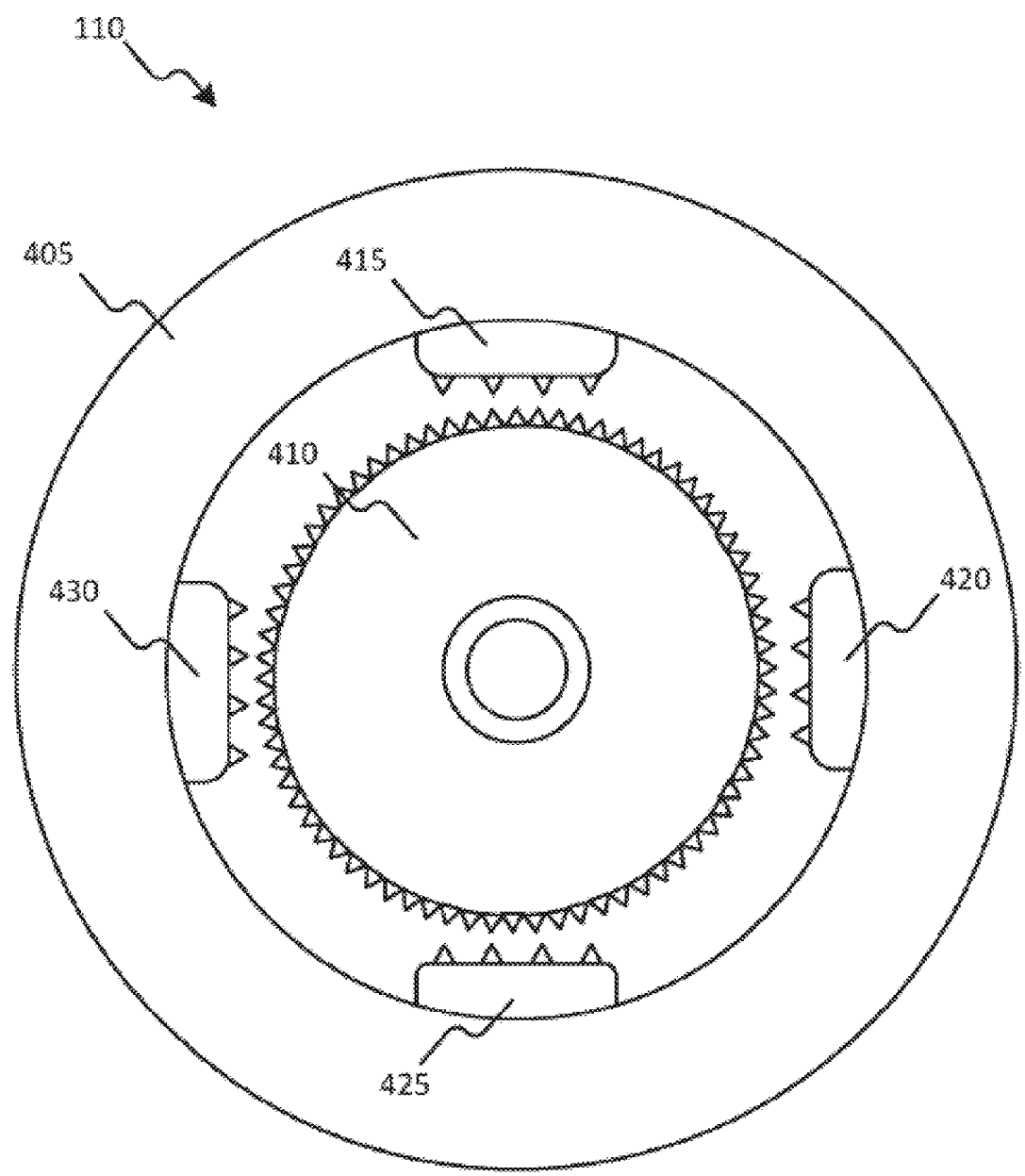
FIG. 4 is a diagram of a motor, in accordance with some embodiments.

In some instances, the first motor 110 and the second motor 112 are brushless DC electric stepper motors that divide a full rotation into a number of equal full steps. FIG. 4 is one example embodiment of the first motor 110 configured as a stepper motor. The example embodiment of the first motor 110 illustrated in FIG. 4 includes a stator 405 and a rotor 410. The stator 405 includes, for example, four coils (for example, a first coil 415, a second coil 420, a third coil 425, and a fourth coil 430). The rotor 410 includes, for example, a gear-shaped piece of iron having a plurality of teeth. The four coils 415, 420, 425, and 430 are selectively energized to make rotor 410 rotate. For example, the first coil 415 is energized, which magnetically attracts the teeth of the rotor 410. When the teeth of the rotor 410 are aligned with first coil 415, they are slightly offset from second coil 420. Thus, when the second coil 420 is energized and the first coil 415 is de-energized, the rotor 410 rotates slightly to align the teeth of the rotor 410 with the second coil 420. Each rotation caused by energizing one of the four coils 415, 420, 425, and 430 is a full step. In some embodiments, the first motor 110 includes 200 full steps. With 200 total full steps, each full step equates to approximately 1.8 degrees of rotation.

Instead of energizing one coil at a time with a full pulse of current, the first 110 can energize two adjacent coils with partial pulses of current. For example, when the first coil 415 is energized with a pulse of current having an amplitude value of twenty-five percent and the second coil 420 is energized with a pulse of current having an amplitude value of seventy-five percent, the rotor 410 rotates to a position that is between two adjacent full steps. In this manner, the first motor 110 divides each full step into a number of micro steps. The number of micro steps for each full step is set based on the amplitude resolution of the current pulses. In other words, the number of micro steps for each full step is generally equal to the number of different amplitudes values that can be generated. For example, eight bits of resolution equates to current pulses with 256 different amplitude values and, thus, 256 micro steps for each full step. In some embodiments, the first motor 110 includes 256 micro steps for each full step. With 200 total full steps and 256 micro steps for each full step, each micro step equates to approximately 0.007 degrees of rotation.

In some embodiments, the second motor 112 includes, among other things, all or a combination of the components described herein as being included in the first motor 110.

The first magnetic position sensor 160 and the second magnetic position sensor 166 include transducers and/or sensors (for example, hall effect sensors) that vary their output voltages in response to a magnetic field generated by the first magnet 158 and the second magnet 164. The resolution of a rotary position sensor is defined by the number of distinct angular positions that the rotary position sensor can detect per revolution. Resolution is often described in terms of bits. For example, ten bits of resolution equates to 1,024 detectable angular positions per revolution, and twelve bits of resolution equates to 4,096 detectable angular positions per revolution.

Figure 5A:
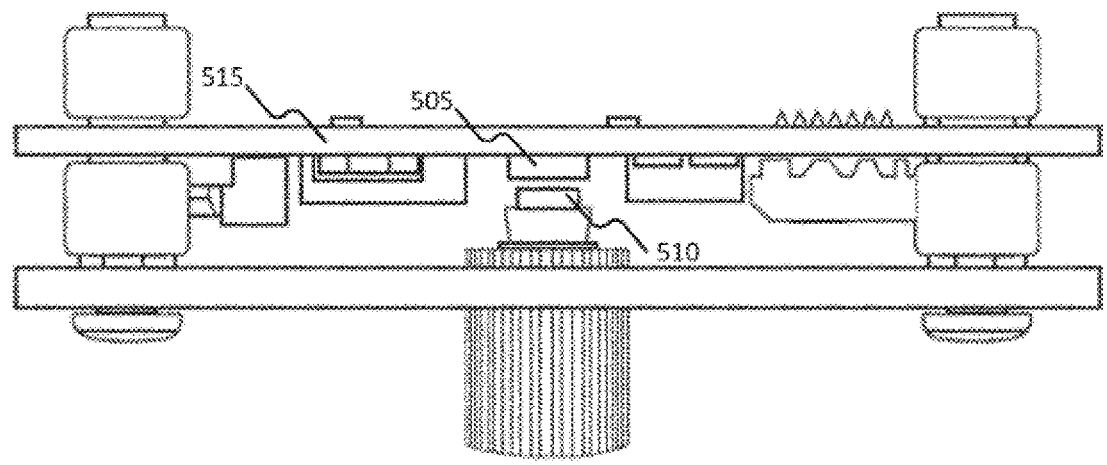
FIG. 5A is a side view of a test magnet and a ten bit magnetic position sensor, in accordance with some embodiments.
Figure 5B:
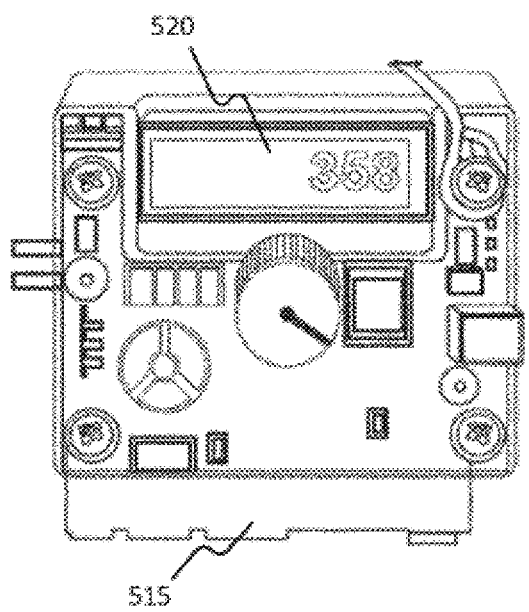
FIG. 5B is a side view of a test magnet at a first angular position and a ten bit magnetic position sensor, in accordance with some embodiments.
Figure 5C:
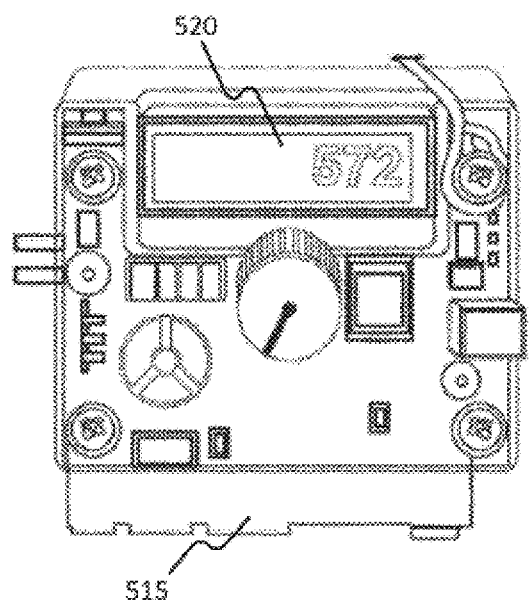
FIG. 5C is a side view of a test magnet at a second angular position and a ten bit magnetic position sensor, in accordance with some embodiments.

FIGS. 5A, 5B, and 5C illustrate an example of a ten bit magnetic position sensor 505 that detects the angular position of a test magnet 510. The magnetic position sensor 505 is coupled to a circuit board 515. The test magnet 510 is positioned near the ten bit magnetic position sensor 505 such that the ten bit magnetic position sensor 505 detects the magnetic field generated by the test magnet 510. However, as illustrated in FIG. 5A, the test magnet 510 is separated from the ten bit magnetic position sensor 505 by a short distance. The distance between the magnetic position sensor 505 and the test magnet 510 may be, for example, between approximately 0.2 millimeters and 2 millimeters. The ten bit magnetic position sensor 505 measures the angular position of the test magnet 510 and determines an integer value between zero and 1,023 that corresponds to the detected angular position of the test magnet 510. The determined integer value may be displayed on a display 520 that is also coupled to the circuit board 515. For example, in FIG. 5B, the test magnet 510 is positioned at a first angular position and the display 520 displays a determined integer value of 358. FIG. 5C illustrates the test magnet 510 after the test magnet 510 has been moved from the first angular position to a second angular position. The display 520 is FIG. 5C displays a determined integer value of 572 for the second angular position. In some embodiments, the first magnetic position encoder 114 and the second magnetic position encoder 116 include a ten bit magnetic position sensor (such as the ten bit magnetic position sensor 505 described above).

The first magnetic position sensor 160 measures the angular position of the first magnet 158 and generates a position signal indicating the measured angular position of the first magnet 158. As rotational movement between the first magnet 158 and the first magnetic position sensor 160 mirrors the rotational movement of the housing 102 about the first axis of rotation 124, the position signal also indicates the angular position of the housing 102 about the first axis of rotation 124. In some embodiments, the position signal includes a digital value indicating the measured angular position of the first magnet 158. For example, for when the first magnetic position sensor 160 includes a ten bit magnetic position sensor (such as the ten bit magnetic position sensor 505 described above), the position signal can include a digital integer value between zero and 1,023. Alternatively or in addition, the position signal includes a pulse width modulated (PWM) signal in which the duty cycle indicates the measured angular position of the first magnet 158. For example, a ten percent duty cycle may indicate that the measured angular position of the first magnet 158 is 36 degrees and a five percent duty cycle may indicate that the measured angular position of the first magnet 158 is 18 degrees. In some embodiments, the first magnetic position sensor 160 outputs the absolute angular position of the first magnet 158 as a ten-bit value over a serial data link.

The second magnetic position sensor 166 measures the angular position of the second magnet 164 and generates a position signal indicating the measured angular position of the second magnet 164. As rotational movement between the second magnet 164 and the second magnetic position sensor 166 mirrors the rotational movement of the housing 102 about the second axis of rotation 126, the position signal also indicates the angular position of the housing 102 about the second axis of rotation 124. In some embodiments, the position signal generated by the second magnetic position sensor 166 is similar to the position signal generated by the first magnetic position sensor 160 described above.

Figure 6:
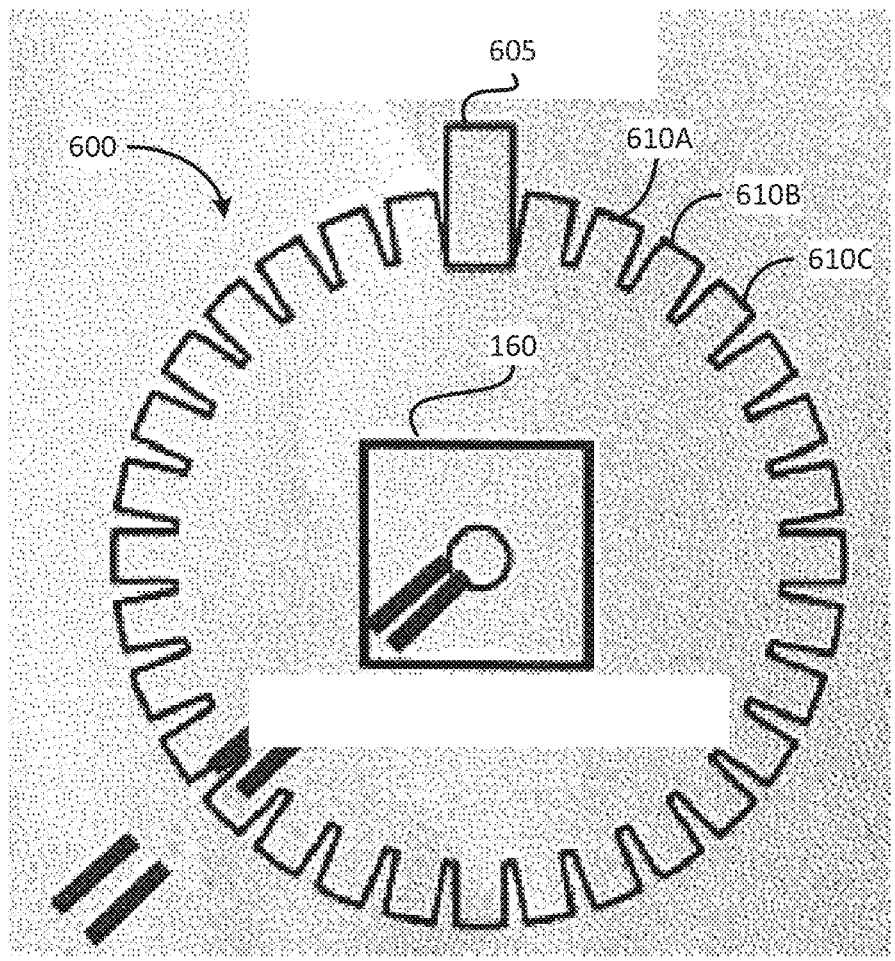
FIG. 6 is a front view of an indexer, in accordance with some embodiments.

In some instances, in addition to the first magnetic position sensor 160, the moving light fixture 100 further includes an indexer to further detect the angular position of the housing 102. FIG. 6 illustrates an example indexer 600. The example indexer 600 includes a plurality of tabs 610 (such as a first tab 610A, a second tab 610B, and a third tab 610C). In some instances, the indexer 600 is coupled to the second shaft 138 such that the indexer 600 rotates with the second shaft 138. In other instances, the indexer 600 is coupled to the first shaft 136 such that the indexer 600 rotates with the first shaft 136.

Figure 7A:
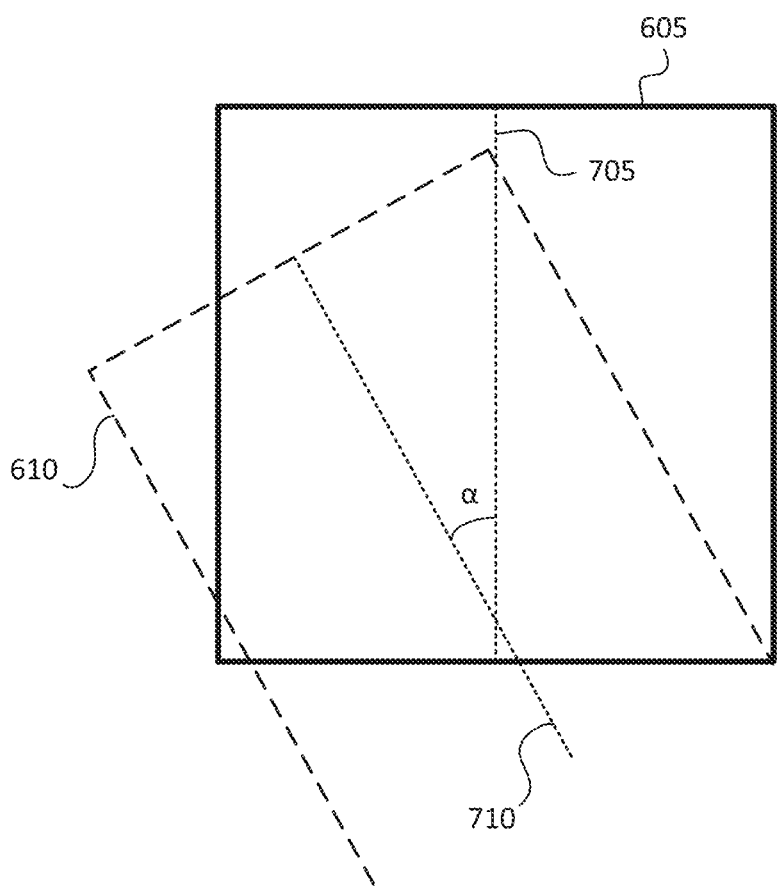
FIGS. 7A-7C are views of tabs of the indexer of FIG. 6 detected by an optical sensor, in accordance with some embodiments.
Figure 7B:
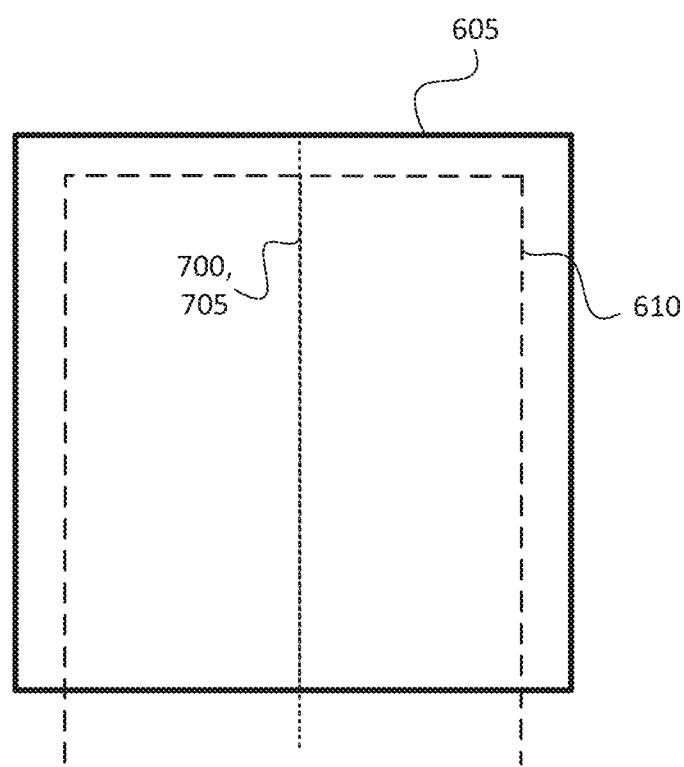
Figure 7C:
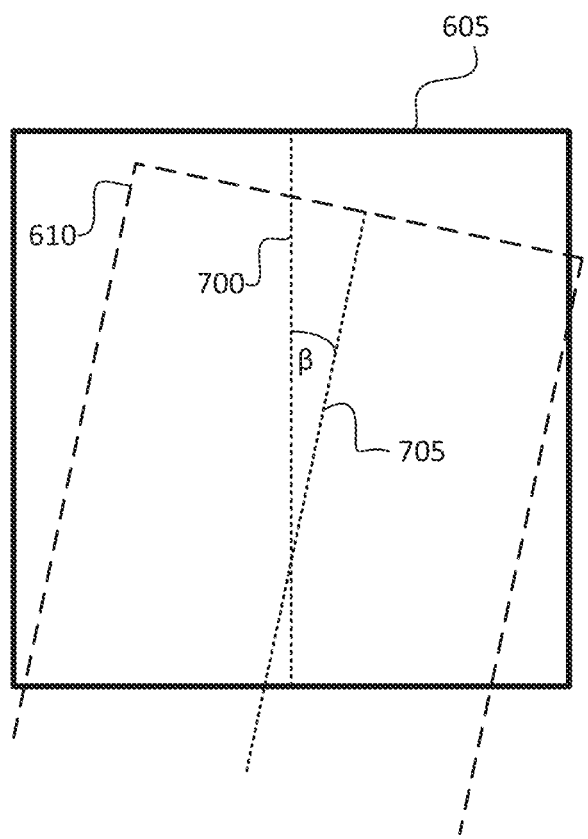

The indexer 600 includes an optical sensor 605 to determine a position of the indexer 600 based on the plurality of tabs 610. For example, as the plurality of tabs 610 rotate past the optical sensor 605, the optical sensor 605 determines an angular position of the second shaft 138, and therefore an angular position of the housing 102. FIGS. 7A-7C illustrate example positions of the plurality of tabs 610 detected by the optical sensor 605, in accordance with some embodiments. The optical sensor 605 includes a sensor center 705. The tab 610 includes a tab center 710. In the example of FIGS. 7A-7C, the position of a respective tab 610 is determined relative to the optical sensor 605. For example, FIG. 7A illustrates the tab 610 at a first angular position where the sensor center 705 and the tab center 710 are separated by an angle of α. FIG. 7B illustrates the tab 610 at a second angular position where the sensor center 705 and the tab center 710 are substantially aligned (e.g., separated by an angle of approximately 0). FIG. 7C illustrates the tab 610 at a third angular position where the sensor center 705 and the tab center 710 are separated by an angle of β. In some instances, each tab 610 further includes a unique identifier such that the optical sensor 605 identifies which tab 610 is being observed.

While FIG. 6 illustrates an indexer 600 configured as a wheel having a plurality of tabs 610, other implementations of the indexer 600 may be considered. For example, the indexer 600 may be configured as a printed film having a pattern in place of (or, in addition to) the plurality of tabs 610. The sensor 605 provides a signal indicative of a position of the pattern. In another example, the indexer 600 includes a magnetic film having a varying magnetic characteristic. In such an instance, rather than an optical sensor, sensor 605 may be configured as a magnetic sensor (e.g., a hall effect sensor) configured to detect the magnetic field of the magnetic film and provide a signal indicative of a position of the magnetic film.

Figure 8:
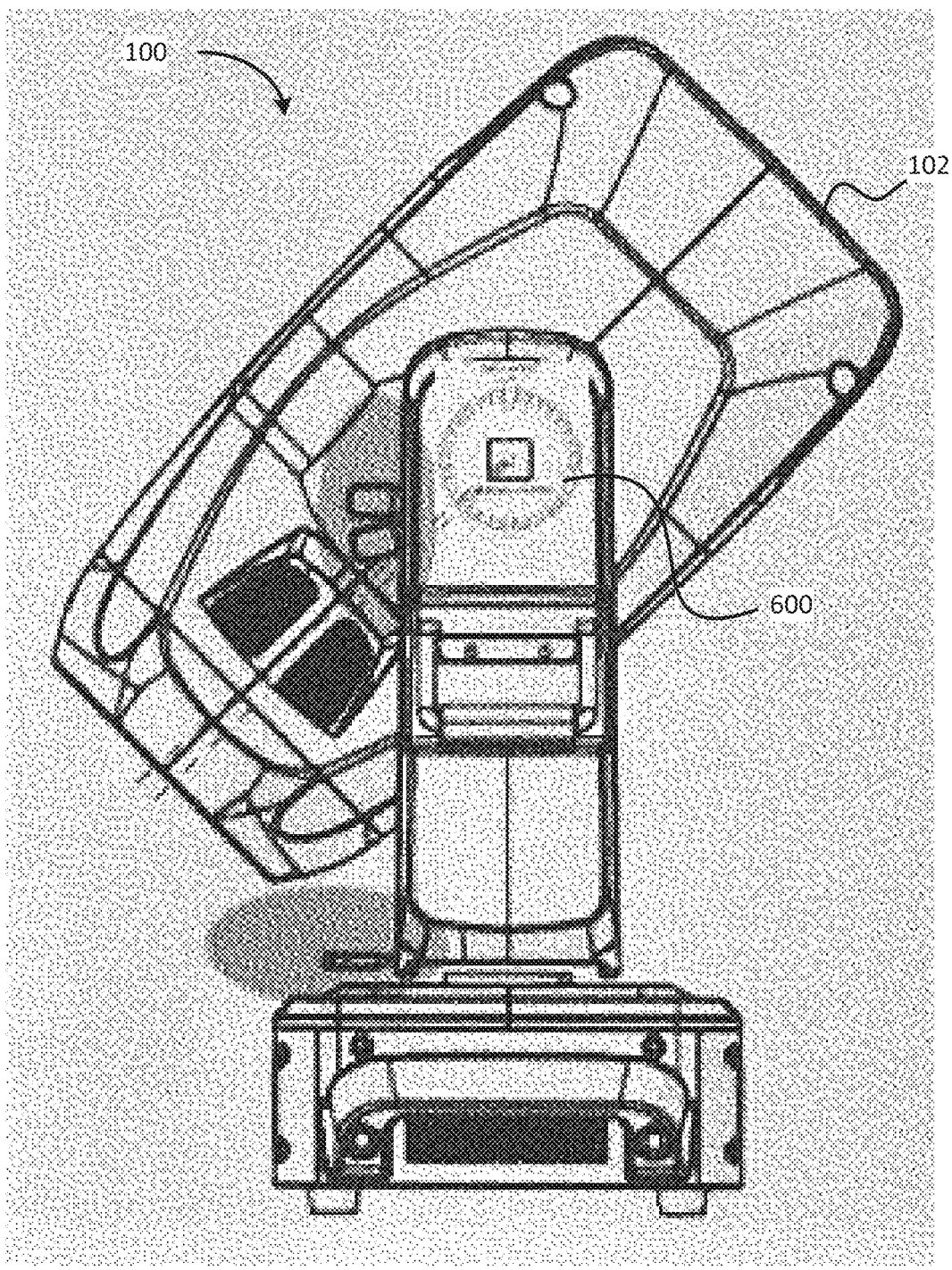
FIG. 8 is a rear view of a moving light fixture including the indexer of FIG. 6, in accordance with some embodiments.

FIG. 8 illustrates the indexer 600 situated within the housing 102, in accordance with some embodiments. As previously stated, the indexer 600 may be coupled to the second shaft 138 such that the indexer 600 rotates about the first axis of rotation 124 in conjunction with the second shaft 138 (and therefore in conjunction with the housing 102). In some instances, the moving lighting fixture 100 includes a second indexer (not shown) coupled to the third shaft 148. Accordingly, the second indexer rotates about the second axis of rotation 126 in conjunction with the third shaft 148 (and therefore in conjunction with the housing 102). In such an implementation, a second optical sensor (not shown) is provided to detect a position of the second indexer. In some embodiments, the second indexer is instead coupled to the second output shaft 140 or the fourth shaft 150.

Figure 9:
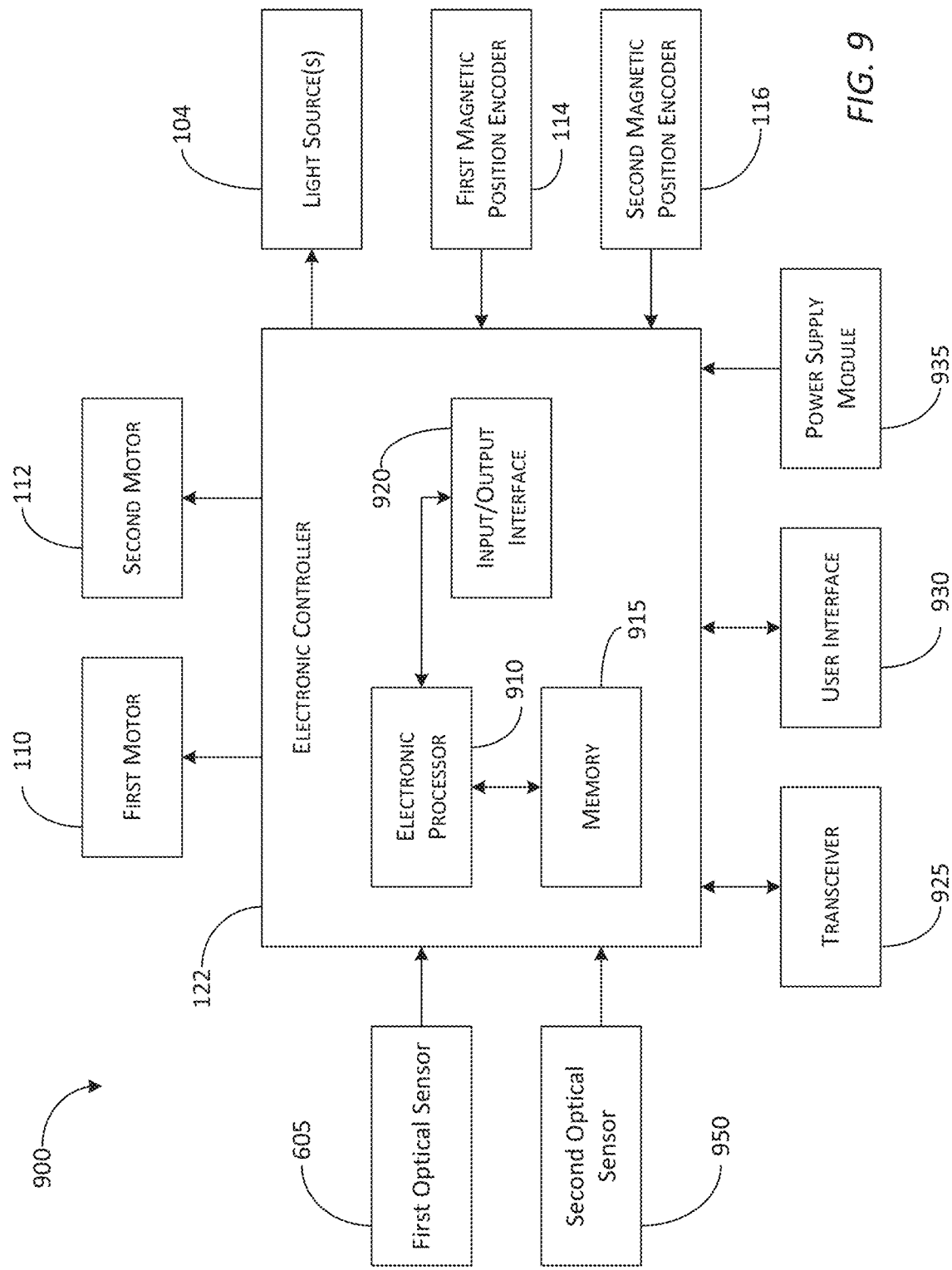
FIG. 9 is a block diagram of a control system for the moving light fixture, in accordance with some embodiments.

Movement of the housing 102 is controlled based on signals from the first magnetic position sensor 160, the second magnetic position sensor 166, the optical sensor 605, and a second optical sensor 950. FIG. 9 is an example of a control system 900 for the moving light fixture 100. The example illustrated in FIG. 9 includes the one or more light sources 104, the first motor 110, the second motor 112, the first magnetic position encoder 114, the second magnetic position encoder 116, the first optical sensor 605, a second optical sensor 950, the electronic controller 122, a transceiver 925, a user interface 930, and a power supply module 935.

The electronic controller 122 includes a plurality of electrical and electronic components that provide power, operational control, and protection to the components and modules within the moving light fixture 100. The electronic controller 122 illustrated in FIG. 9 includes, among other things, an electronic processor 910 (for example, a microprocessor, a microcontroller, or another suitable programmable device), memory 915, and an input/output interface 920. The electronic processor 910, the memory 915, the input/output interface 920, as well as the various modules connected to the electronic controller 122 are connected by one or more control and/or data buses (for example, a common bus). The control and/or data buses are shown generally in FIG. 9 for illustrative purposes. The input/output interface 920 includes routines for transferring information between components within the electronic controller 122 and other components of the control system 900. In some implementations, the electronic controller 122 is implemented partially or entirely on a semiconductor (for example, a field-programmable gate array ["FPGA"] semiconductor) chip.

The memory 915 includes, for example, read-only memory (ROM), random access memory (RAM) (for example, dynamic RAM [DRA<], synchronous DRAM [SDRAM], etc.), electronically erasable programmable read-only memory (EEPROM), flash memory, a hard disk, an SD card, other non-transitory computer-readable media, or a combination thereof. The electronic processor 910 is connected to the memory 915 and executes software instructions that are capable of being stored in a RAM of the memory 915 (for example, during execution), a ROM of the memory 915 (for example, on a generally permanent basis), or another non-transitory computer readable medium such as another memory or a disc. Alternatively or in addition, the memory 915 is included in the electronic processor 910. Software included in some implementations of the moving light fixture 100 can be stored in the memory 915 of the electronic controller 122. The software includes, for example, firmware, one or more applications, program data, filters, rules, one or more program modules, and other executable instructions. The electronic processor 910 is configured to retrieve program instructions and data from the memory 915 for generating necessary control signals for the first motor 110 and the second motor 112 that are required to drive the motors to move the moving light fixture 100 to a desired position. In other constructions, the electronic controller 122 includes additional, fewer, or different components.

The transceiver 925 transmits and/or receives signals to and/or from one or more separate communication modules in other components of a lighting system (for example, a control board, other light fixtures, etc.). Signals may include, for example, information, data, serial data, data packets, analog signals, or a combination thereof. The transceiver 925 can be coupled to one or more separate transceivers via wires, fiber, wirelessly, or a combination thereof. Communication via wires, fiber, or both can be any appropriate network topology known to those skilled in the art, such as Ethernet. Wireless communication can be any appropriate wireless network topology known to those skilled in the art, such as Wi-Fi, ZigBee®, Bluetooth®, and the like. In some embodiments, the transceiver 925 includes separate transmitters and receivers.

The user interface 930 is included to control the moving light fixture 100 or the operation of a lighting system as a whole. The user interface 930 is operably coupled to the electronic controller 122 to control, for example, the position of the moving light fixture 100. The user interface 930 can include any combination of digital and analog input devices required to achieve a desired level of control for the system. For example, the user interface 930 can include a computer having a display and input devices, a touch-screen display, a plurality of knobs, dials, switches, buttons, faders, or the like. In some constructions, the user interface 930 is separated from the moving light fixture 100.

The power supply modules 935 supplies a nominal AC or DC voltage to the moving light fixture 100, or a system of moving light fixtures. The power supply modules 935 is powered by a mains power having nominal line voltages between, for example, 100 Volt and 240 Volt AC and frequencies of approximately 50 Hertz to 60 Hertz. The power supply module 935 is also configured to supply lower voltages to operate circuits and components within the moving light fixture 100. Alternatively or in addition, the moving light fixture 100 is powered by one or more batteries or battery packs.

The electronic controller 122 controls the position of the moving light fixture 100 via the first motor 110 and the second motor 112. The electronic controller 122 is operably coupled to the first motor 110 and to the second motor 112 to provide one or more control signals thereto. In some embodiments, the control signals are modulated current pulses that are generated internally by the first motor 110 and the second motor 112.

As described above, the first motor 110 and the second motor 112 are controlled according to both full steps and micro steps based on how the first coil 415 and the second coil 420 are energized. Upon start-up the electronic controller 122 does not know the current full step and current partial (or micro) step of the first motor 110 and the second motor 112. As described herein, the first magnet 158 (or the first magnetic position sensor 160) is operably coupled to the housing 102 such that it rotates with the housing 102 about the first axis of rotation 124. Thus, the measured angular position of the first magnet 158 mirrors the angular position of the rotor 410 in the first motor 11. By measuring the angular position of the first magnet 158 with the first magnetic position sensor 160, the electronic controller 122 determines the current full step of the first motor 110. In a similar manner, the electronic controller 122 determines the current full step of the second motor 112 by measuring the angular position of the second magnet 164 with the second magnetic position sensor 166.

Additionally, as described herein, the indexer 600 is operably coupled to the second shaft 138 such that the indexer 600 rotates with the housing 102 about the first axis of rotation 124. Thus, by measuring the position of the indexer 600 with the first optical sensor 605, the electronic controller 122 determines the current micro step of the first motor 110. In a similar manner, the electronic controller 122 determines the current micro step of the second motor 112 by determining the position of a second indexer (not shown) with the second optical sensor 950.

The resolution of the first magnetic position encoder 114 is greater than the full step resolution of the first motor 110 such that the first magnetic position encoder 114 can measure multiple angular positions of the first magnet 158 for each full step of the first motor 110. For example, if the first magnetic position encoder 114 includes ten bits of resolution and the first motor 110 includes two-hundred full steps, the first magnetic position encoder 114 is able to measure approximately fifty-one distinct angular positions of the first magnet 158 for each full step of the first motor 110. Similarly, the resolution of the second magnetic position encoder 116 is greater than the full step resolution of the second motor 112 such that the second magnetic position encoder 116 can measure multiple angular positions of the second magnet 164 for each full step of the second motor 112.

In some instances, the electronic controller 122 determines the absolute position of the moving light fixture 100 based in part on the current full step of the first motor 110, the current micro step of the first motor 110, the current full step of the second motor 112, the current micro step of the second motor 112, or a combination thereof. With the knowledge of the current absolute position of the moving light fixture 100, the electronic controller 122 is able to determine the number of both full steps and micro steps to rotate the first motor 110, the second motor 112, or both to adjust the moving light fixture 100 from its current position to a new position (for example, a target position).

Figure 10:
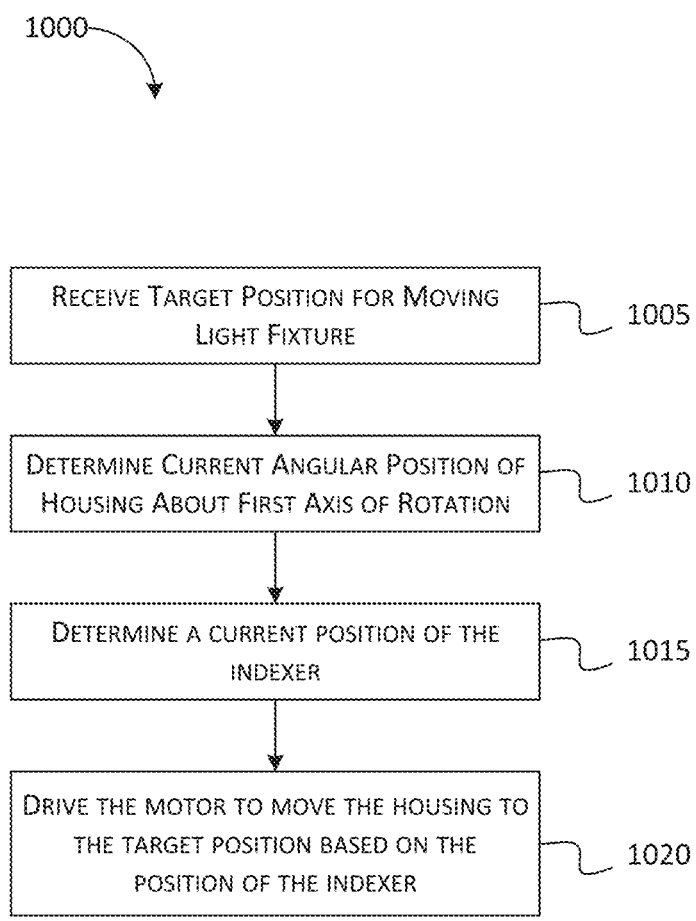
FIG. 10 is a block diagram of a method performed by the control system of FIG. 9, in accordance with some embodiments.

FIG. 10 illustrates an example method 1000 for controlling the position of the moving light fixture 100 about a single axis of rotation. For brevity, the method 1000 is described in terms of controlling the position of the moving light fixture 100 about the first axis of rotation 124 (i.e., tilting movements). However, the same or a similar method may also be used to control the position of the moving light fixture 100 about the second axis of rotation 126 (i.e., panning movements). The steps of the method 1000 are described in an iterative manner for descriptive purposes. Various steps described herein with respect to the method 1000 are capable of being executed simultaneously, in parallel, or in an order that differs from the illustrated serial and iterative manner of execution.

At block 1005, the electronic controller 122 receives a target position for the moving light fixture 100. In some embodiments, the target position includes a desired angle of rotation of the housing 102 about the first axis of rotation 124 with respect to a predetermined reference position. For example, the target position can indicate a desired angle of approximately 45 degrees away from the reference position about the first axis of rotation 124. Alternatively or in addition, the target position includes a numerical value that corresponds to a desired angle of rotation of the housing 102 about the first axis of rotation 124 with respect to a predetermined reference position. For example, a target position of 3 on a scale between 1 and 10 may indicate a desired angle of approximately 45 degrees away from the reference position about the first axis of rotation 124. In some embodiments, the electronic controller 122 receives the target position via the user interface 930. For example, a user inputs the target position via buttons included in some embodiments of the user interface 930. Alternatively or in addition, the electronic controller 122 receives the target position via the transceiver 625. For example, the electronic controller 122 receives the target position via the transceiver 625 from a central control board in a theater.

At block 1010, the electronic controller 122 determines a current angular position of the housing 102 about the first axis of rotation 124. For example, the first magnetic position sensor 160 transmits a signal indicative of the measured angular position of the first magnet 158 to the electronic controller 122. The electronic controller 122 determines the angular position of the housing 102 about the first axis of rotation 124 based on the received position signal. Alternatively or in addition, the first magnetic position encoder 114 determines the angular position of the housing about the first axis of rotation 124 and transmits the angular position to the electronic controller 122. In some examples, the angular position of the housing 102 is determined as a degree value between, for example, zero degrees and 360 degrees. In other examples, the angular position of the housing 102 is determined as a numerical value in a range of detectable angular positions. For example, the determined angular position of the housing 102 can be an integer value between zero and 1,024 when the first magnetic position sensor 160 includes ten bits of resolution.

At block 1015, the electronic controller 122 determines a current position of the indexer 600. For example, the first optical sensor 605 transmits a signal to the electronic controller 122 indicative of a position of a tab 610. The electronic controller 122 determines the current position of the indexer 600 based on the position of the tab 610. In some examples, the current position of the indexer 600 is determined as a degree value between, for example, zero degrees and 360 degrees. In other examples, the current position of the indexer 600 is determined as a numerical value in a range of detectable indexer positions.

At block 1020, the electronic controller 122 drives the first motor 110 to move the housing 102 to the target position from the current angular position and based on the position of the indexer 600. For example, the electronic controller 122 drives the first motor 110 according to full steps based on the determined current angular position of the housing 102 to rotate the housing to the target position. The electronic controller 122 then drives the first motor 110 according to micro steps based on the current position of the indexer 600. The first motor 110 may be driven either clockwise or counter-clockwise to achieve the target position. Accordingly, the electronic controller 122 uses the position of the indexer 600 to precisely drive the first motor 110.

Figure 11:
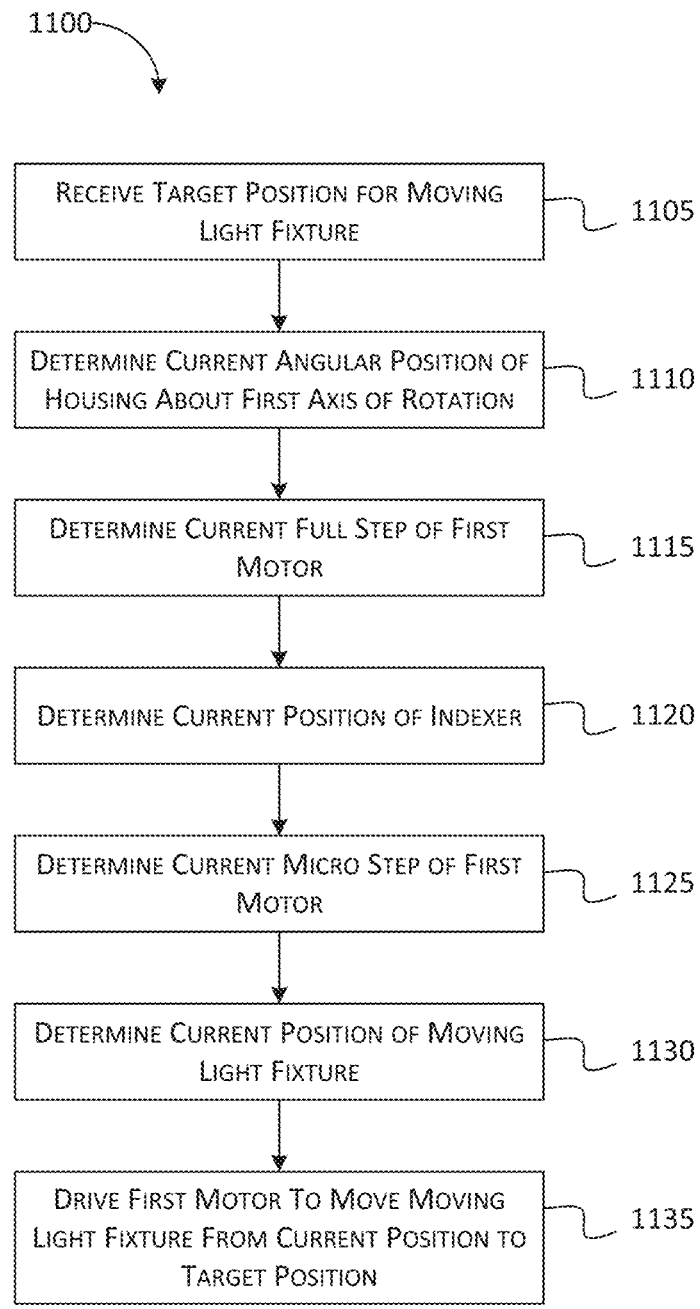
FIG. 11 is a block diagram of another method performed by the control system of FIG. 9, in accordance with some embodiments.

FIG. 11 illustrates another example method 1100 for controlling the position of the moving light fixture 100. For brevity, the method 1100 is described in terms of controlling the position of the moving light fixture 100 about the first axis of rotation 124 (i.e., tilting movements). However, the same or a similar method may also be used to control the position of the moving light fixture 100 about the second axis of rotation 126 (i.e., panning movements). The steps of the method 1100 are described in an iterative manner for descriptive purposes. Various steps described herein with respect to the method 1100 are capable of being executed simultaneously, in parallel, or in an order that differs from the illustrated serial and iterative manner of execution.

At block 1105, the electronic controller 122 receives a target position for the moving light fixture 100. In some embodiments, the target position includes a desired angle of rotation of the housing 102 about the first axis of rotation 124 with respect to a predetermined reference position. For example, the target position can indicate a desired angle of 45 degrees away from the reference position about the first axis of rotation 124. Alternatively or in addition, the target position includes a numerical value that corresponds to a desired angle of rotation of the housing 102 about the first axis of rotation 124 with respect to a predetermined reference position. For example, a target position of 3 on a scale between 1 and 10 may indicate a desired angle of 45 degrees away from the reference position about the first axis of rotation 124. In some embodiments, the electronic controller 122 receives the target position via the user interface 930. For example, a user inputs the target position via buttons included in some embodiments of the user interface 930. Alternatively or in addition, the electronic controller 122 receives the target position via the transceiver 625. For example, the electronic controller 122 receives the target position via the transceiver 625 from a central control board in a theater.

At block 1110, the electronic controller 122 determines a current angular position of the housing 102 about the first axis of rotation 124. For example, the first magnetic position sensor 160 transmits a signal indicative of the measured angular position of the first magnet 158 to the electronic controller 122. The electronic controller 122 determines the angular position of the housing 102 about the first axis of rotation 124 based on the received position signal. Alternatively or in addition, the first magnetic position encoder 114 determines the angular position of the housing about the first axis of rotation 124 and transmits the angular position to the electronic controller 122. In some examples, the angular position of the housing 102 is determined as a degree value between, for example, zero degrees and 360 degrees. In other examples, the angular position of the housing 102 is determined as a numerical value in a range of detectable angular positions. For example, the determined angular position of the housing 102 can be an integer value between zero and 1,024 when the first magnetic position sensor 160 includes ten bits of resolution.

At block 1115, the electronic controller 122 determines a current full step of the first motor 110 based on the angular position of the housing 102 about the first axis of rotation 124. Each full step of the first motor 110 maps to a range of angular positions of the housing 102. In some embodiments, a mapping between the detectable angular position of the housing 102 and the full steps of the first motor 110 are included in a look up table stored, for example, in the memory 915. In such embodiments, the electronic controller 122 uses the look up table to determine the full step of the first motor 110 that maps to the angular position of the housing 102 detected by the first magnetic position encoder 114. For example, an angular position of 18 degrees for the housing 102 (or a numerical value of 51 on a ten bit scale) maps to the tenth full step of the first motor 110, and the angular position of 36 degrees for the housing 102 (or a numerical value of 102 on a ten bit scale) maps to the twentieth full step of the first motor 110.

At block 1120, the electronic controller 122 determines a current position of the indexer 600. For example, the first optical sensor 605 transmits a signal to the electronic controller 122 indicative of a position of a tab 610. The electronic controller 122 determines the current position of the indexer 600 based on the position of the tab 610. In some examples, the current position of the indexer 600 is determined as a degree value between, for example, zero degrees and 360 degrees. In other examples, the current position of the indexer 600 is determined as a numerical value in a range of detectable indexer positions.

At block 1125, the electronic controller 122 determines a current micro step of the first motor 110 based on the current position of the indexer 600. Each micro step of the first motor 110 maps to a position of the indexer 600 (e.g., a position of the plurality of tabs 610). In some embodiments, a mapping between the position of the indexer 600 and the micro steps of the first motor 110 are included in a look up table stored, for example, in the memory 915. In such embodiments, the electronic controller 122 uses the look up table to determine the micro step of the first motor 110 that maps to the position of the indexer 600 detected by the first optical sensor 605.

At block 1130, the electronic controller 122 determines the current position of the moving light fixture 100 based in part on the current full step and the current micro step of the first motor 110. In some embodiments, the current position is an angle. For example, if the full step of the first motor 110 is designated by $S_{Full}$ and the micro step of the first motor 110 is designated by $S_{Micro}$, the current position, P, of the moving light fixture can be calculated as shown below in EQN 1. EQN 1 can be used to calculate the angular position of the moving light fixture 100.

$$P = (S_{Full} \times 1.8°) + (S_{Micro} \times 0.007°) \quad \text{[EQN 1]}$$

For example, the electronic controller 122 determines that the current position of the moving light fixture 100 is 41.778 degrees when the current full step is 23 and the current micro step is 54 (i.e., $(23 \times 1.8°) + (54 \times 0.007°) = 41.778°$).

At block 1135, the electronic controller 122 drives the first motor 110 to move the moving light fixture 100 from the current position to the target position. In some embodiments, the electronic controller 122 sends one or more control signals to the first motor 110 to change the current full step and the current micro step of the first motor 110 to a target full step and micro step that corresponds to the received target position of the moving light fixture 100. In some embodiments, the one or more control signals include a plurality of current pulses which cause the full step and the micro step of the first motor 110 to change from their current values to the target values. Alternatively or in addition, the one or more control signals indicate the number of full steps the first motor 110 should move, the direction of the movement (for example, clockwise or counter-clockwise), and the target micro step. For example, the one or more control signals may indicate that the first motor 110 should move 37 full steps and 100 micro steps in a clockwise direction.

Figure 12:
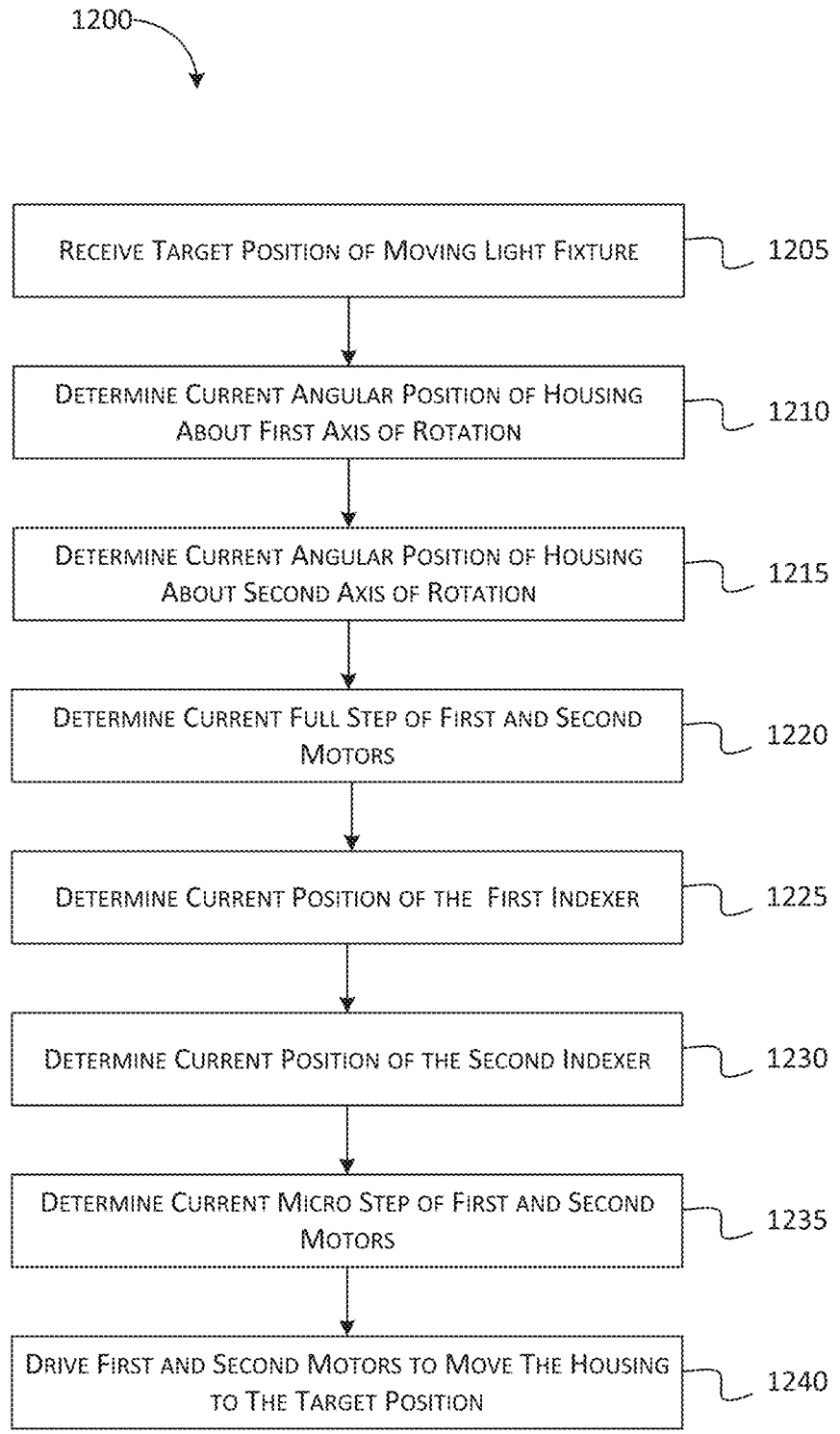
FIG. 12 is a block diagram of another method performed by the control system of FIG. 9, in accordance with some embodiments.

FIG. 12 illustrates an example method 1200 for controlling the position of the moving light fixture 100 about two different axes of rotation. The method 1200 is described in terms of controlling the position of the moving light fixture 100 about the first axis of rotation 124 and the second axis of rotation 126 (i.e., tilting movements and panning movements). The steps of method 1200 are described in an iterative manner for descriptive purposes. Various steps described herein with respect to the method 1200 are capable of being executed simultaneously, in parallel, or in an order that differs from the illustrated serial and iterative manner of execution.

At block 1205, the electronic controller 122 receives a target position of the moving light fixture 100. In some embodiments, the target position includes a desired angle of rotation of the housing 102 about the first axis of rotation 124 with respect to a predetermined reference position, a desired angle of rotation of the housing 102 about the second axis of rotation 126 with respect to a predetermined reference position, or both. At block 1210, the electronic controller 122 determines a current angular position of the housing 102 about the first axis of rotation 124 (for example, a first angular position). At block 1215, the electronic controller 122 determines an angular position of the housing 102 about the second axis of rotation 126 (for example, a second angular position).

At block 1220, the electronic controller 122 determines the current full step of the first motor 110 and the second motor 112. For example, the electronic controller 122 determines the current full step of the first motor 110 based on the angular position of the housing 102 about the first axis of rotation 124. The electronic controller 122 also determines the current full step of the second motor 112 based on the angular position of the housing 102 about the second axis of rotation 126.

At block 1225, the electronic controller 122 determines a current position of the first indexer 600 with respect to a predetermined reference position. For example, the first optical sensor 605 transmits a signal to the electronic controller 122 indicative of a position of a tab 610. The electronic controller 122 determines the current position of the indexer 600 based on the position of the tab 610. At block 1230 the electronic controller 122 determines a current position of the second indexer with respect to a predetermined reference position. For example, the second optical sensor 950 transmits a signal to the electronic controller 122 indicative of a position of a second tab. The electronic controller 122 determines the current position of the second indexer based on the position of the second tab.

At block 1235, the electronic controller 122 determines the current micro step of the first motor 110 and the second motor 112. For example, the electronic controller 122 determines the current micro step of the first motor 110 based on the position of the first indexer 600. The electronic controller 122 also determines the current micro step of the second motor 112 based on the position of the second indexer. At block 1240, the electronic controller 122 drives the first motor 110, the second motor 112, or both to move the housing 102 to the target position.

Aside from moving the moving light fixture 100 in response to receiving a target position, the electronic controller 122 can move the moving light fixture 100 to restore it to a target position when the moving light fixture 100 is hit by an object or hits an object. For example, the moving light fixture 100 may hit a piece of nearby scenery while moving to a target position. As a further example, the moving light fixture 100 may be hit by a nearby object while the moving light fixture 100 is positioned at a target position. In some embodiments, in the manner described herein, the electronic controller 122 detects the current position of the moving light fixture 100 continuously or periodically based on the measured angular position from the first magnetic position encoder 114, the measured angular position from the second magnetic position encoder 116, the current position of the indexer 600 as measured by the first optical sensor 605, the current position of the second indexer as measured by the second optical sensor 950, or a combination thereof. Responsive to detecting an unplanned change in position, the electronic controller 122 may use the newly determined position of the moving light fixture 100 to drive the first motor 110 and the second motor 112 to move the moving light fixture 100 to the target position.

Thus, embodiments described herein provide, among other things, a moving light fixture and a method for controlling the position of the moving light fixture. Various features and advantages are set forth in the following claims.

What is claimed is:

1. A moving light fixture comprising:
   a housing;
   one or more light sources disposed within the housing;
   a motor operably coupled to the housing such that the motor rotates the housing about an axis of rotation;
   an indexer configured to rotate in conjunction with the housing along the axis of rotation;
   a magnetic position encoder configured to transmit a first position signal indicating an angular position of the housing about the axis of rotation;
   an optical sensor configured to transmit a second position signal indicating a position of the indexer about the axis of rotation; and
   an electronic controller connected to the motor, the magnetic position encoder, and the optical sensor, the electronic controller configured to:
      receive a target position for the moving light fixture,
      determine the angular position of the housing about the axis of rotation based on the first position signal, the angular position of the housing having a first resolution,
      determine a position of the indexer corresponding to the angular position of the housing based on the second position signal, the position of the indexer having a second resolution greater than the first resolution,
      determine a current position of the housing based on the angular position of the housing and the position of the indexer, and
      drive the motor to move the housing from the current position to the target position based on the position of the indexer.

2. The moving light fixture of claim 1, wherein the electronic controller is further configured to:
   determine a current full step of the motor based on the angular position of the housing about the axis of rotation,
   determine a current micro step of the motor based on the position of the indexer about the axis of rotation, and
   determine the current position of the housing based on the current full step of the motor and the current micro step of the motor.

3. The moving light fixture of claim 1, wherein the indexer includes a plurality of tabs.

4. The moving light fixture of claim 3, wherein the electronic controller further includes a memory storing a position table mapping each tab included in the plurality of tabs to an angular range of the housing.

5. The moving light fixture of claim 1, wherein the indexer includes a printed film having a pattern, and wherein the second position signal is indicative of a position of the pattern.

6. The moving light fixture of claim 1, wherein the indexer includes a magnetic film.

7. The moving light fixture of claim 1, further comprising a base coupled to the housing such that the housing is rotatable relative to the base about the axis of rotation,
   wherein the magnetic position encoder includes:
      a magnet operably coupled to the housing such that the magnet rotates with the housing about the axis of rotation, and
      a magnetic position sensor fixably coupled to the base and positioned adjacent to the magnet.

8. The moving light fixture of claim 1, further comprising a base coupled to the housing such that the housing is rotatable relative to the base about the axis of rotation,
   wherein the magnetic position encoder includes:
      a magnetic position sensor operably coupled to the housing such that the magnetic position sensor rotates with the housing about the axis of rotation, and
      a magnet fixably coupled to the base and positioned adjacent to the magnetic position sensor.

9. The moving light fixture of claim 1, wherein the axis of rotation is a first axis of rotation, and
   wherein the moving light fixture further includes a second motor operably coupled to the housing such that the second motor rotates the housing about a second axis of rotation,
   wherein the second axis of rotation is perpendicular to the first axis of rotation,
   wherein the moving light fixture further includes a second magnetic position encoder configured to transmit a third position signal indicating an angular position of the housing about the second axis of rotation,
   wherein the moving light fixture further includes a second indexer configured to rotate in conjunction with the housing along the second axis of rotation, and
   wherein the moving light fixture further includes a second optical sensor configured to transmit a fourth position signal detecting a position of the second indexer about the second axis of rotation.

10. The moving light fixture of claim 9, wherein the electronic controller is further configured to:
   determine a second angular position of the housing about the second axis of rotation based on the third position signal,
   determine a position of the second indexer based on the fourth position signal,
   determine a second current position based on the second angular position of the housing about the second axis of rotation and the position of the second indexer, and
   drive the second motor to move the moving light fixture from the second current position to the target position.

11. The moving light fixture of claim 1, wherein the axis of rotation is a horizontal axis of rotation.

12. A method of controlling a position of a moving light fixture, the moving light fixture including one or more light sources disposed within a housing, a motor operably coupled to the housing such that the motor rotates the housing about an axis of rotation, and an indexer configured to rotate in conjunction with the housing along the axis of rotation, the method comprising:
   receiving a target position for the moving light fixture,
   determining, with an electronic controller and based on a first signal from a magnetic position encoder, an angular position of the housing about the axis of rotation, the angular position having a first resolution,
   determining, with the electronic controller and based on a second signal from an optical sensor, a position of the indexer having a second resolution greater than the first resolution and corresponding to the angular position of the housing about the axis of rotation,
   determining, with the electronic controller, a current position of the housing based on the angular position of the housing about the axis of rotation and the position of the indexer, and
   driving, with the electronic controller, the motor to move the housing from the current position to the target position.

13. The method of claim 12, further comprising:
   determining a current full step of the motor based on the angular position of the housing about the axis of rotation,
   determining a current micro step of the motor based on the position of the indexer about the axis of rotation, and
   determining the current position of the housing based on the current full step of the motor and the current micro step of the motor.

14. The method of claim 12, wherein the axis of rotation is a first axis of rotation, and
   wherein the moving light fixture further includes a second motor operably coupled to the housing such that the second motor rotates the housing about a second axis of rotation,
   wherein the second axis of rotation is perpendicular to the first axis of rotation, and
   wherein the moving light fixture further includes a second indexer configured to rotate in conjunction with the housing along the second axis of rotation.

15. The method of claim 14, further comprising:
   determining, with the electronic controller and based on a third signal from a second magnetic position encoder, an angular position of the housing about the second axis of rotation,
   determining, with the electronic controller and based on a fourth signal from a second optical sensor, a position of the second indexer,
   determining, with the electronic controller, the current position of the housing based on the angular position of the housing about the second axis of rotation and the position of the second indexer, and
   driving, with the electronic controller, the second motor to move the moving light fixture from the current position to the target position.

16. A moving light fixture comprising:
   a housing;
   one or more light sources disposed within the housing;
   a motor operably coupled to the housing such that the motor rotates the housing about an axis of rotation;
   an indexer configured to rotate in conjunction with the housing along the axis of rotation;
   a magnetic position encoder configured to transmit a first position signal indicating an angular position of the housing about the axis of rotation;
   an optical sensor configured to transmit a second position signal indicating a position of the indexer about the axis of rotation; and
   an electronic controller connected to the motor, the magnetic position encoder, and the optical sensor, the electronic controller configured to:
      receive a target position for the moving light fixture,
      determine the angular position of the housing about the axis of rotation based on the first position signal, the angular position of the housing having a first resolution,
      determine full step of the motor based on the angular position of the housing,
      determine a position of the indexer corresponding to the angular position of the housing and based on the second position signal, the position of the indexer having a second resolution greater than the first resolution,
      determine a micro step of the motor based on the position of the indexer, determine a current position of the housing based on the full step of the motor and the micro step of the motor, and drive the motor to move the housing from the current position to the target position.

17. The moving light fixture of claim 16, wherein the motor is a stepper motor.

18. The moving light fixture of claim 16, wherein the indexer includes at least one of a plurality of tabs, a printed film having a pattern, and a magnetic film.

19. The moving light fixture of claim 16, wherein the axis of rotation is a first axis of rotation, and wherein the moving light fixture further includes a second motor operably coupled to the housing such that the second motor rotates the housing about a second axis of rotation, wherein the second axis of rotation is perpendicular to the first axis of rotation, wherein the moving light fixture further includes a second magnetic position encoder configured to transmit a third position signal indicating an angular position of the housing about the second axis of rotation, wherein the moving light fixture further includes a second indexer configured to rotate in conjunction with the housing along the second axis of rotation, and wherein the moving light fixture further includes a second optical sensor configured to transmit a fourth position signal detecting a position of the second indexer about the second axis of rotation.

20. The moving light fixture of claim 19, wherein the electronic controller is further configured to:

determine a second angular position of the housing about the second axis of rotation based on the third position signal, determine a full step of the second motor based on the second angular position of the housing about the second axis of rotation, determine the position of the second indexer corresponding to the second angular position of the housing based on the fourth position signal, determine a micro step of the second motor based on the position of the second indexer, determine a second current position of the housing based on the full step of the second motor and the micro step of the second motor, and drive the second motor to move the moving light fixture from the second current position to the target position.

* * * * *